/ [11] 3,623,792

[72] Inventor Toshifumi Uetake
Tokyo, Japan
[21] Appl. No. 10,397
[22] Filed Feb. 11, 1970
[45] Patented Nov. 30, 1971
[73] Assignee Olympus Optical Co., Ltd.
Tokyo, Japan

[54] OBJECTIVE LENS FOR A MICROSCOPE
1 Claim, 8 Drawing Figs.
[52] U.S. Cl. ............ 350/229,
350/175 ML, 350/177
[51] Int. Cl. ............ G02b 9/12,
G02b 21/02
[50] Field of Search ............ 350/229,
228, 176, 177

[56] References Cited
UNITED STATES PATENTS
2,781,694  2/1957  Takahashi ............ 350/229
3,355,234  11/1967  Muller ............ 350/176
3,437,398  4/1969  Muller et al. ............ 350/220 X

*Primary Examiner* — John K. Corbin
*Attorney* — Kurt Kelman

ABSTRACT: Objective lens for a microscope of dry system high magnification having a leading lens element or group of which the lens element forming the air contacting surface at the image side is made of a glass having a high refractive index equal to or higher than 1.72 and a low index of dispersion equal to or higher than 50, the refracting surface at the object side of the lens element or group immediately succeeding the leading lens element or group being made convex toward the object while the amount of the airgap between the rearmost lens element or group and the lens element or group immediately preceding the rearmost than element or group is made equal to or greater than 0.7 times the focal length of the entire optical system of the objective lens, so that the various aberrations particularly the astigmatism and the curvature of field are widely compensated for.

OBJECTIVE LENS FOR A MICROSCOPE

BACKGROUND OF THE INVENTION

The present invention relates to an objective lens for a microscope, and more particularly to a dry system high magnification objective lens for a microscope.

The prior art objective lens of the type described above has suffered its unavoidable undercorrection of astigmatism thereby resulting in insufficient resolution in the marginal zone of the field of view while the compensation of the curvature of field is insufficient in comparison with the proper Petzval image plane thereof due to the undercorrection of the astigmatism thereby deteriorating the flatness of the image plane, because the prior art objective lens has in general the refractive index and the index of dispersion of the lens element in the leading lens element or group forming the air-contacting surface at the image side thereof less than 1.72 and 50, respectively, and the refracting surface at the object side of the lens element or group immediately succeeding the leading lens element or group is made concave toward the object, while the airgap between the rearmost lens element or group and the lens element or group immediately preceding the rearmost lens element or group is relatively short, thereby making it difficult to compensate for the curvature of field and the spherical aberration as well as axial chromatic aberration and the chromatic aberration of magnification while the compensating power for the astigmatism is entirely lost and the corrective power of the coma is made insufficient.

The present invention aims to avoiding the disadvantages of the prior art objective lens as described above.

SUMMARY OF THE INVENTION

An object of the present invention is to provide a novel and useful objective lens for a microscope of the type described above which positively eliminates the above-described disadvantages of the prior art objective lens.

Another object is to provide a novel and useful objective lens of the type described above which has an improved flatness of the image plane while the resolution in the marginal zone of the field of view is widely improved.

The above objects are achieved in accordance with the present invention by the provision of an objective lens characterized by the fact that the lens element of the leading lens element or group forming the air-contacting surface at the image side thereof is made of glass material having a high refractive index and a low index of dispersion satisfying the following requirements:

$$nd \geq 1.72$$
$$vd \geq 50$$

where $nd$ and $vd$ designate the refractive index and the index of dispersion, respectively, and that the refracting surface at the object side of the lens element or group immediately succeeding the leading lens element or group is made convex toward the direction of the object, while the amount of the airgap between the rearmost lens element or group and the lens element or group immediately preceding the rearmost lens element or group is made relatively great so that the following requirement is satisfied:

$$0.7F \leq D$$

where $F$ and $D$ designate the focal length of the entire optical system of the objective lens and the amount of the airgap between the rearmost lens element or group and the preceding lens element or group.

In the present invention, the leading lens group located nearest to the object may be made a single lens element, but it is essential to make the lens element of the leading lens group forming the air-contacting surface at the image side thereof by a glass material having the following characteristics:

$$nd \geq 1.72$$
$$vd \geq 50$$

where $nd$ and $vd$ are the refractive index and the index of dispersion, respectively. These requirements are referred to as condition A hereinafter. The condition A is indispensable in order (1) to compensate for the curvature of field, (2) to remove the axial chromatic aberration as well as the chromatic aberration of magnification and (3) to compensate for the spherical aberration.

If the above refractive index $nd$ is made smaller than 1.72, then it is made extremely difficult to simultaneously remove the curvature of field and the spherical aberration. And, if the above index of dispersion is made smaller than 50, then it is made almost impossible to compensate for the axial chromatic aberration and the chromatic aberration of magnification simultaneously. Particularly, the chromatic aberration of magnification is extremely deteriorated.

Further, in the present invention, it is also essential to make the refracting surface at the object side of the lens element or group immediately succeeding the leading lens element or group convex toward the object. This requirement is referred to as condition B hereinafter. The condition B makes it possible to sufficiently compensate for the serious undercorrection of the astigmatism unavoidably taking place in the leading lens element or group.

If the above refractive surface is made concave toward the object, then the corrective power of the astigmatism is entirely lost. And, even though the above refracting surface is made flat, the correcting power of the astigmatism is insufficient.

Finally, in the present invention, it is essential that the amount of the airgap between the rearmost lens element or group and the lens element or group immediately preceding the rearmost lens element or group satisfies the following requirement:

$$0.7F \leq D$$

where $F$ and $D$ designate the focal length of the entire optical system of the objective lens and the amount of the airgap between the rearmost lens element or group and the preceding lens element or group. This requirement is referred to as condition C hereinafter. The condition C is indispensable for compensating for the coma of the entire optical system of the objective lens constructed in accordance with the conditions A and B.

If the above-described amount $D$ of the airgap is made smaller than $0.7F$, then the above-described correcting power of the coma is made insufficient.

DETAILED DESCRIPTION OF THE PREFERRED EMBODIMENT

Referring to FIGS. 1 and 2A–2C, the prior art objective lens is constructed of a leading lens element, an intermediate lens group having two lens elements cemented to each other and a rearmost lens group also comprised of two lens elements cemented to each other.

Figure 1:
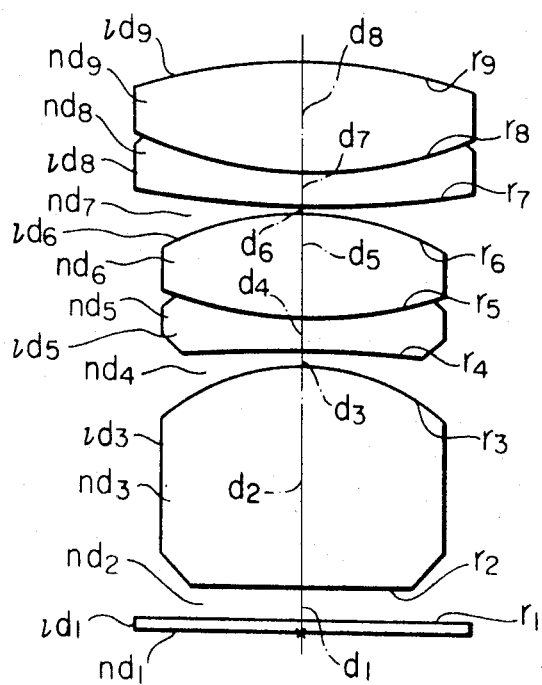
FIG. 1 is a longitudinal sectional view showing the construction of a dry system high magnification objective lens of the prior art.

The numerical data of the objective lens of FIG. 1 are given in table 1 below.

TABLE 1

| | $\gamma$ | $d$ | $nd$ | $vd$ |
|---|---|---|---|---|
| 1 | ∞ | 0.641 | 1.523 | 60.0 |
| 2 | ∞ | 3.8 | 1.0 | |
| 3 | −3.85 | 0.26 | 1.7409 | 27.7 |
| 4 | −40.0 | 0.56 | 1.0 | |
| 5 | 8.01 | 1.90 | 1.7409 | 27.7 |
| 6 | −5.08 | 0.09 | 1.4886 | 69.8 |
| 7 | 18.9 | 0.56 | 1.0 | |

| | | | | |
|---|---|---|---|---|
| 8 | 6.80 | 1.90 | 1.7409 | 27.7 |
| 9 | −8.78 | | 1.4886 | 69.8 |
| | | | 1.0 | |

Thickness of Cover Glass $S_1 = -0.17$
Magnification $B = -40.0X$
Numerical Aperture N.A. $= 0.65$ The symbols $\gamma$, $d$ designate the radius of curvature of the lens elements including cover glass and the thickness of the lens elements or the airgap between the adjacent two lens elements including cover glass, while $nd$, $vd$ designate the refractive index and the index of dispersion of the lens elements including cover glass.

Figures 2A, 2B, 2C:
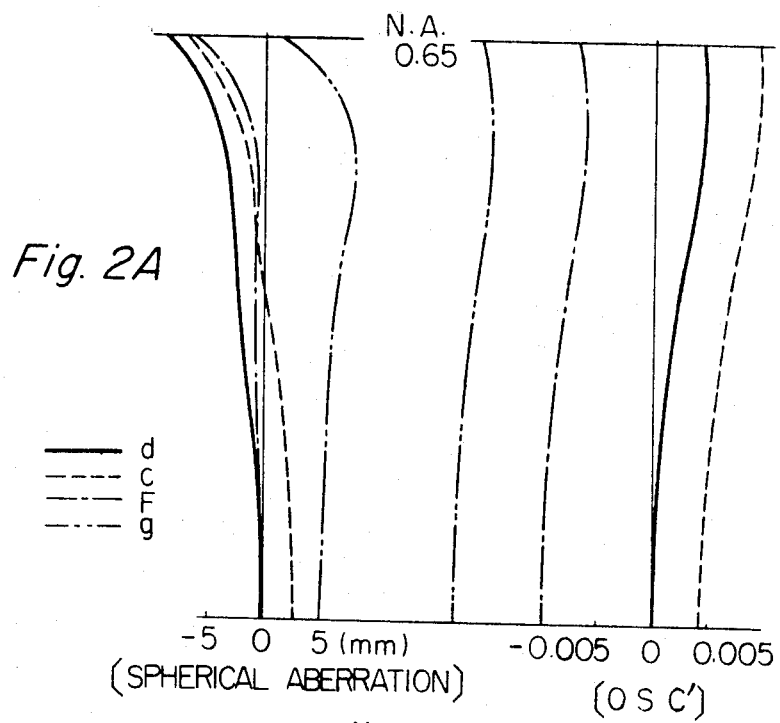
FIGS. 2A–2C are diagrams showing various aberration curves of the objective lens of FIG. 1.

FIGS. 2A–2C show the various aberration curves of the objective lens shown in table 1.

As seen from FIG. 2B, the astigmatism is undercorrected so that the resolution of the marginal zone of the field of of view is not satisfactory. Also, the compensation for the curvature of field is insufficient due to the undercorrection of the astigmatism.

Figure 3:
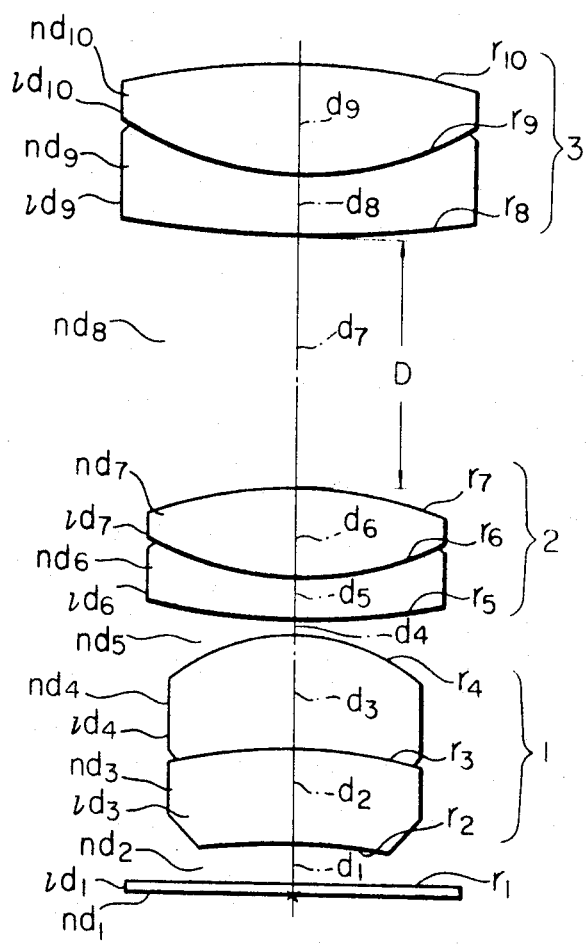
FIG. 3 is a view similar to FIG. 1 but showing the preferred embodiment of the objective lens constructed in accordance with the present invention.
Figures 4A, 4B, 4C:
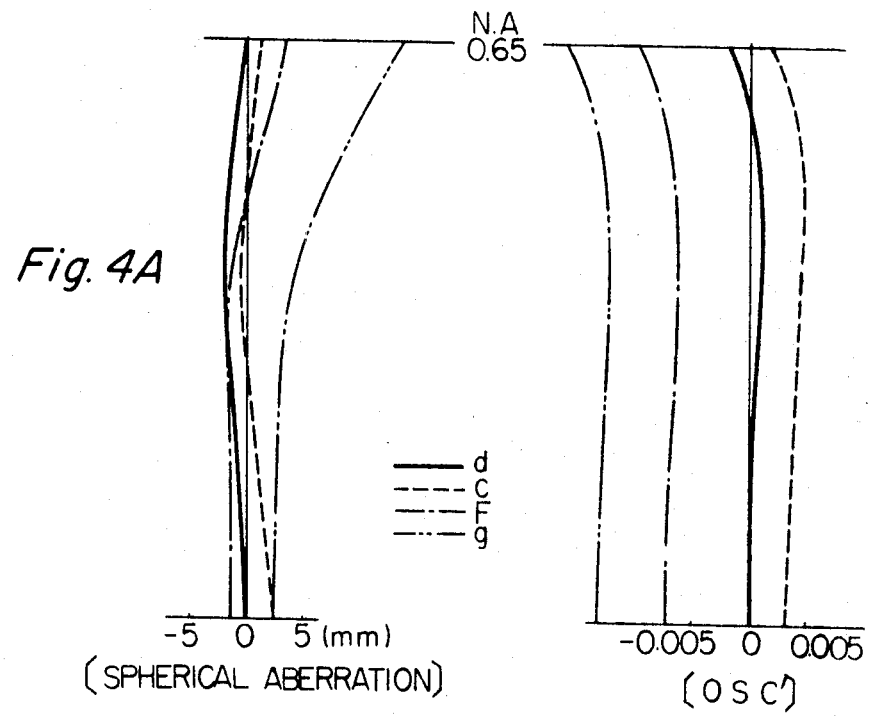
FIGS. 4A–4C are similar to FIGS. 2A–2C but show various aberration curves of the objective lens shown in FIG. 3.

The objective lens of the present invention shown in FIG. 3 has the numerical data shown in table 2 and the various aberration curves of the objective lens of table 2 are shown in FIGS. 4A–4C.

TABLE 2

| | $\gamma$ | $d$ | $nd$ | $vd$ |
|---|---|---|---|---|
| 1 | ∞ | 0.669 | 1.523 | 60.0 |
| 2 | −24.1 | 1.7 | 1.0 | |
| 3 | −9.25 | 1.9 | 1.699 | 30.0 |
| 4 | −3.54 | 0.25 | 1.789 | 51.0 |
| 5 | +12.4 | 0.67 | 1.0 | |
| 6 | +5.32 | 1.70 | 1.785 | 26.0 |
| 7 | −7.02 | 4.30 | 1.486 | 82.0 |
| 8 | +20.7 | 0.99 | 1.0 | |
| 9 | +5.85 | 1.99 | 1.717 | 48.0 |
| 10 | −12.5 | | 1.488 | 70.0 |
| | | | 1.0 | |

Thickness of Cover Glass $S_1 = -0.17$
Magnification $B = -40.0X$
Numerical Aperture N.A. $= 0.65$ The symbols $\gamma$ and $d$ designate the radius of curvature of lens elements including cover glass and the thickness of the lens elements or the amount of the airgap between the adjacent two lens elements including cover glass, respectively, and $nd$ and $vd$ designate the refractive index and the index of dispersion of the lens elements including cover glass, respectively, while the numerals at the leftmost column designate the order of the arrangement of the lens elements including cover glass beginning at the side of the leading lens element.

As is evident from the comparison of FIGS. 4A–4C and FIG. 2A–2C, the various aberrations such as the spherical aberration, the axial chromatic aberration, the coma OSC', the chromatic aberration of magnification, the astigmatism, the curvature of field, and the distortion of the present invention are highly compensated for in comparison with the prior art objective lens, particularly, the improvement in the compensation for the astigmatism and the curvature of field is remarkable.

I claim:

1. Objective lens for a microscope comprised of a leading lens component, a lens component immediately succeeding said leading lens component with an airgap provided therebetween and a rearmost lens component with an airgap provided between the same and a lens component immediately preceding said rearmost lens component, wherein the improvement comprises the fact that the air-contacting surface of said leading lens component at the image side thereof is formed by a lens element of said leading lens component which is made of a glass material having a high refractive index and a low index of dispersion satisfying the following requirements:

$$nd \geq 1.72$$
$$vd \geq 50$$

where $nd$ and $vd$ designate the refractive index and the index of dispersion, respectively, the refracting surface at the object side of said lens component immediately succeeding said leading lens component being made convex toward the direction of the object, the amount $D$ of the airgap between said rearmost lens component and said lens component immediately preceding said rearmost lens component satisfying the following requirement:

$$0.7F \leq D$$

where $F$ designates the focal length of the entire optical system of said objective lens, said lens having the following numerical data:

| | $\gamma$ | $d$ | $nd$ | $vd$ |
|---|---|---|---|---|
| 1 | ∞ | 0.669 | 1.523 | 60.0 |
| 2 | −24.1 | 1.7 | 1.0 | |
| 3 | −9.25 | 1.9 | 1.699 | 30.0 |
| 4 | −3.54 | 0.25 | 1.789 | 51.0 |
| 5 | +12.4 | 0.67 | 1.0 | |
| 6 | +5.32 | 1.70 | 1.785 | 26.0 |
| 7 | −7.02 | 4.30 | 1.486 | 82.0 |
| 8 | +20.7 | 0.99 | 1.0 | |
| 9 | +5.85 | 1.99 | 1.717 | 48.0 |
| 10 | −12.5 | | 1.488 | 70.0 |
| | | | 1.0 | |

Thickness of Cover Glass $S_1 = -0.17$
Magnification $B = -40.0X$
Numerical Aperture N.A. $= 0.65$ where $\gamma$ and $d$ designate the radius of curvature of the lens elements including cover glass and the thickness of the lens elements or the amount of the airgap between the adjacent two lens elements including cover glass, respectively, and $nd$ and $v d$ designate the refractive index and the index of dispersion of the lens elements including cover glass, respectively, while the numerals at the leftmost column designate the order of the arrangement of the lens elements including cover glass beginning at the side of the leading lens element.

* * * * *